US012701505B2

(12) United States Patent (10) Patent No.: US 12,701,505 B2
Armenta et al. (45) Date of Patent: Aug. 4, 2026

(54) ENERGY SAVING UTILIZING CONTAINERIZED CORE NETWORK FUNCTIONS WITH MULTIHOMING

(71) Applicant: Boost SubscriberCo L.L.C., Englewood, CO (US)

(72) Inventors: Julio Armenta, Aldie, VA (US); Mehdi Alasti, Reston, VA (US); Kazi Bashir, Lewisville, TX (US); Siddhartha Chenumolu, Ashburn, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 368 days.

(21) Appl. No.: 18/371,345

(22) Filed: Sep. 21, 2023

(65) Prior Publication Data

US 2025/0008427 A1 Jan. 2, 2025

Related U.S. Application Data

(60) Provisional application No. 63/524,097, filed on Jun. 29, 2023.

(51) Int. Cl.
H04W 52/02 (2009.01)
H04W 24/08 (2009.01)
H04W 28/02 (2009.01)

(52) U.S. Cl.
CPC ....... H04W 52/0203 (2013.01); H04W 24/08 (2013.01); H04W 28/0221 (2013.01)

(58) Field of Classification Search
CPC ..... H04W 52/02; H04W 24/08; H04W 28/02; H04W 28/08; H04W 28/09; H04W 28/24;
(Continued)

(56) References Cited

U.S. PATENT DOCUMENTS 7,929,422 B2 * 4/2011 Ramalho ................. H04L 67/14
370/219
10,862,697 B2 * 12/2020 Mishra ................ H04L 12/4675
(Continued)

FOREIGN PATENT DOCUMENTS

WO 2018167254 A1 9/2018
WO 2021121550 A1 6/2021
(Continued)

OTHER PUBLICATIONS

International Search Report and Written Opinion received for PCT Patent Application No. PCT/US24/31486, mailed on Dec. 20, 2024, 12 pages.
(Continued)

*Primary Examiner* — Man U Phan
(74) *Attorney, Agent, or Firm* — Jeremiah J. Baunach; Frontier IP Law PLLC

(57) ABSTRACT

Methods and systems for scaling energy consumption in wireless network infrastructure, while retaining the ability to quickly scale when load changes. This end is accomplished by using containerized (or virtualized) applications to implement 5G core Network Functions, and utilizing network redundancy/geo-redundancy or a multihoming transport protocol for communication between these containerized (or virtualized) applications and other 5G system elements such as the network functions of the Radio Access Nodes (RANs) or the network functions of 5G Core. In particular, one or more core Network Functions (NFs) are instantiated as containerized applications executing on one or more virtualized hosts in a cloud-native orchestration environment. The containers are selectively activated or deactivated based on a demand for utilization of the associated NF. Because elements of the 5G RAN, 5G Core and one or more NFs are connected to one another via a protocol that supports network redundancy and/or geo-redundancy and/or multihom- (Continued)

ing, endpoint addressing need not be reconfigured when demand on the NFs changes.

18 Claims, 6 Drawing Sheets

(58) Field of Classification Search
CPC ..... H04W 48/12; H04W 48/18; H04W 76/10; H04W 76/12; H04W 76/25; H04W 84/04; H04W 84/18; H04W 72/54; H04W 36/08; H04L 41/08; H04L 41/12; H04L 41/40; H04L 41/50; H04L 29/06; H04L 29/08; H04L 67/10
USPC ........................................................ 370/230
See application file for complete search history.

(56) References Cited

U.S. PATENT DOCUMENTS

| | | | | |
|---|---|---|---|---|
| 10,887,886 B2 * | 1/2021 | Lee | ..................... | H04W 12/08 |
| 11,533,594 B2 | 12/2022 | Purkayastha et al. | | |
| 11,716,308 B2 * | 8/2023 | Mas Rosique | ...... | H04L 61/4511 |
| | | | | 709/245 |
| 11,743,953 B2 * | 8/2023 | Tamvada | .............. | H04W 76/12 |
| | | | | 370/329 |
| 11,751,042 B2 * | 9/2023 | Poornachandran | ... | H04W 4/024 |
| | | | | 455/432.1 |
| 12,284,586 B1 * | 4/2025 | Nguyen | ................ | H04W 40/02 |
| 12,432,606 B1 * | 9/2025 | Krasilnikov | ........ | H04W 88/085 |
| 2006/0133343 A1 * | 6/2006 | Huang | ................ | H04L 61/2525 |
| | | | | 370/349 |
| 2018/0225155 A1 | 8/2018 | Watt, Jr. et al. | | |
| 2020/0100102 A1 * | 3/2020 | Xu | ..................... | H04W 12/033 |
| 2021/0344606 A1 | 11/2021 | Taylor et al. | | |
| 2022/0086218 A1 * | 3/2022 | Sabella | ................ | H04M 15/66 |
| 2022/0312295 A1 | 9/2022 | Hashemi et al. | | |
| 2022/0322211 A1 | 10/2022 | Maria | | |
| 2023/0006889 A1 * | 1/2023 | Thyagaturu | ......... | H04L 41/5054 |
| 2023/0019773 A1 | 1/2023 | Raymond et al. | | |
| 2024/0305533 A1 * | 9/2024 | Bai | ....................... | H04W 24/02 |

FOREIGN PATENT DOCUMENTS

| | | |
|---|---|---|
| WO | 2022031555 A1 | 2/2022 |
| WO | 2022031556 A1 | 2/2022 |
| WO | 2022/110443 A1 | 6/2022 |

OTHER PUBLICATIONS

Balan et al., "Multihoming for Mobile Internet of Multimedia Things," Hindawi Mobile Information Systems, vol. 2017, Sep. 26, 2017. (17 Pages).

Leyva-Pupo et al., "Dynamic UPF placement and chaining reconfiguration in 5G networks," Computer Networks, 215, 2022. (17 Pages).

Sousa et al., "Multihoming Management for Future Networks," Mobile Networks and Applications, Aug. 2011. (14 Pages).

"What are Kubernetes Pods?" VM Ware, The State of Kubernetes, 2021. (3 Pages).

Anonymous: "5G Network Evolution with AWS Design scalable, secure, reliable, and cost-efficient cloud-native core and edge network on AWS", Jul. 31, 2020, pp. 1-48.

Hamdi et al., "A Multi-Weight Strategy for Container Consolidation", 2020 IEEE 4th International Conference on Fog and Edge Computing (ICFEC), May 11, 2020, pp. 11-18.

International search Report and written opinion received for PCT application No. PCT/US24/53944, mailed on Apr. 29, 2025, 14 pages.

Warade et al., "Monitoring the Energy Consumption of Docker Containers", 2023 IEEE 47th Annual Computers, Software, and Applications Conference (COMPSAC) IEEE, Jun. 26, 2023, pp. 1703-1710.

Xu et al., "BrownoutCon: A software system based on brownout and containers for energy-efficient cloud computing", Journal of Systems and Software, vol. 155, May 18, 2019, pp. 91-103.

* cited by examiner 170-3    170-2    170-1

UPF 150

170-3    170-2    170-1

UPF 150

ENERGY SAVING UTILIZING CONTAINERIZED CORE NETWORK FUNCTIONS WITH MULTIHOMING

TECHNICAL FIELD

This patent relates to mobile wireless communication systems, and more particularly to techniques that reduce energy consumption in core network functions.

BACKGROUND

The Third Generation Partnership Project (3GPP) Fifth Generation (5G) Working Group has specified a broad range of wireless services delivered across multiple access platforms and multi-layered networks to support a variety of end uses. 5G utilizes an intelligent Radio Access Network (RAN) architecture that is not constrained by base station proximity or complex network infrastructure.

5G technology has recently evolved such that standardized Information Technology (IT) networking principles and cloud-native design approaches can be leveraged in many ways. Decoupling software from hardware enables replacing various functions such as location management, firewalls, load balancers and routers with virtualized instances running as software. This eliminates the need to invest in expensive hardware elements while accelerating deployment times.

A current trend results in 5G core Network Functions (NFs) running in the cloud and in other virtualized environments. In some embodiments, the virtualized Network Functions may be provided as a virtual machine, image, or an executable application accessible via Application Programming Interfaces ("APIs") and other suitable protocols.

While these recent developments have greatly reduced costs and simplified the design, deployment and management of wireless systems, additional challenges remain.

SUMMARY OF PREFERRED EMBODIMENT(S)

Of particular concern, even in virtualized environments, is power consumption. Energy efficiency has become one of the key performance indicators in 5G and planned 6G network deployments targeted to support diversified use cases. In particular, while 5G radio technology has greatly improved energy efficiency as compared to 4G radio deployments, energy consumption in the data centers that implement 5G core Network Functions remains a concern.

What is needed is a way to scale down energy consumption when load on the Network Functions is low, while still retaining the ability to quickly scale when load increases.

Described herein are methods and systems that accomplish this end by using containerized applications to implement 5G core Network Functions (core NFs) and other Virtualized Network Functions (VNFs), and by utilizing multihoming for communication with the containerized applications associated with such network functions.

More particularly, an example wireless network includes a method or apparatus that operates one or more Radio Access Nodes (RANs) that include one or more RAN elements. One or more Network Functions (NFs) are implemented as one or more software applications housed within one or more containers executing on one or more virtualized hosts. The containers are selectively activated or deactivated based on a demand for utilization of the one or more NFs. Furthermore, the RAN elements and one or more NFs are connected to one another via a protocol that supports multihomed addressing. The multihomed addressing scheme may depend on the demand for utilization of the one or more NFs.

In some implementations, the containers are instantiated in a cloud-native container orchestration system.

The reliable protocol may be GPRS Tunneling Protocol (GTP) over User Datagram Protocol (UDP), a Next Generation Application Protocol (NGAP) over Stream Control Transmission Protocol (SCTP), or other protocols.

The multihoming parameters may include network addresses corresponding to respective associations between one of the RAN elements and one of the NFs.

The containers may each be dedicated to a specific type of NF.

The NFs may include 5G core functions such as of Access and Mobility Management Function (AMF), Session Management Function (SMF), User Plane Function, Unified Data Repository (UDR), Unified Data Management (UDM), Authentication Server Function (AUSF), Network Slice Selection Function (NSSF), Network Exposure Function (NEF), NF Repository Function (NRF), Policy Control function (PCF), Application Function (AF) and Data Network (DN) core services.

A controller may determine a processing load on the containers that are dedicated to the specific type of NF. When the present load is above a predetermined amount, then a number of containers dedicated to the specific type of NF is increased, and when the load is below a certain amount, then the number of containers dedicate to the specific type of NF is decreased.

The RAN elements may include one or more of a Centralized Unit-Control Plane (CU-CP), Centralized Unit-User Plane (CU-UP), Distributed Unit (DU), or Radio Unit (RU).

BRIEF DESCRIPTION OF THE DRAWINGS

Features and advantages of the approaches discussed herein are evident from the text that follows and the accompanying drawings, where.

DETAILED DESCRIPTION OF PREFERRED EMBODIMENT(S)

Figure 1:
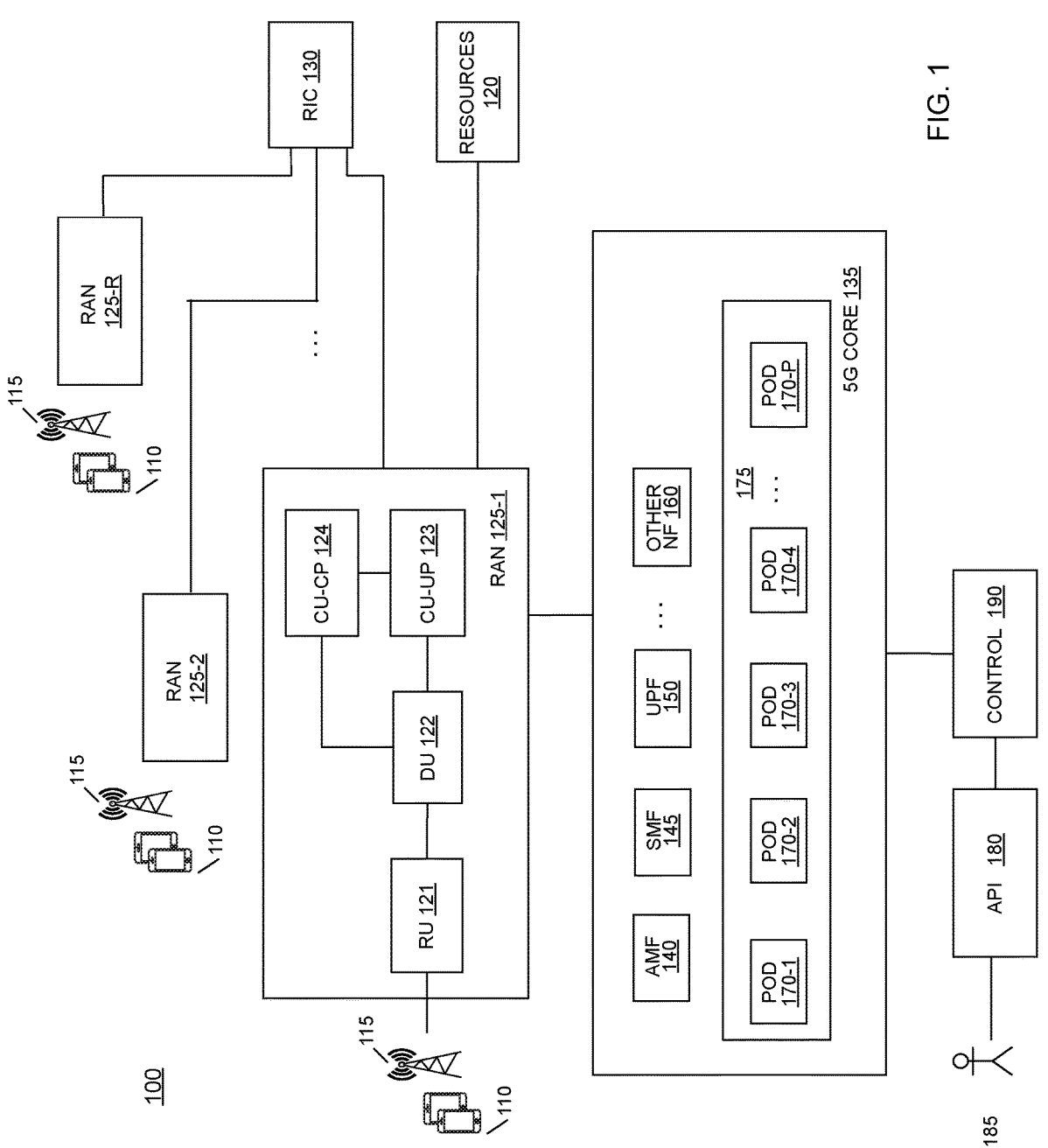
FIG. 1 is an example wireless network with core Network Functions implemented as containerized applications.

FIG. 1 is a block diagram of an example wireless communication system 100 that optimizes energy consumption by leveraging multihoming for core Network Functions instantiated as containerized applications.

The example wireless communications system 100 includes one or more Radio Access Nodes (RANs) 125, a 5G core 135 and other elements.

Each RAN 125-1, 125-2, . . . 125-R provides the functions of a 3GPP Evolved Node B (eNB) or Next Generation Node B (gNB) base station, disaggregating these functions into Centralized Unit (CU) split into a Control Plane (CU-CP) 124 and a User Plane (CU-UP) 123, a Data Unit (DU) 122, and a Radio Unit (RU) 121. These RAN components collectively provide connectivity between User Equipment 110, the 5G core 135 and other resources 120.

These components of the RANs 125 may operate according to 3GPP-compliant New Radio (NR) protocols such as Open RAN. The components can be controlled together or independently and can be deployed on either physical machines (e.g. as small cell hardware) or as virtual machines running on dedicated servers, as shared cloud resources, or some combination thereof.

The Radio Intelligent Controller (RIC) 130 is a logical node that enables near-real-time and non-real-time control of one or more of the RAN 125s in system 100. For example, the RIC 130 may provide configuration management, analytics, policy enforcement, enrichment information, Machine Learning (ML) model management, and other optimizations.

CUs 123, 124 in an example RAN 125-1 are responsible for connectivity to other resources 120, such as the Internet and/or other public or private networks. In other embodiments, such resources 120 may also be accessible directly by the CUS 123, 124, and/or by the DUs 122.

The CU-CP 124 and CU-UP 123 are responsible for providing functions such as Radio Resource Control (RRC), Service Data Adaptation Protocol (SDAP), and Packet Data Convergence Protocol (PDCP). The CU-CP 124 is a logical node that provides the control plane portion of RRC and PDCP. The CU-UP 123 is a logical node that provides functions of a user plane portion of SDAP and PDCP.

The DU 122 is a logical node that provides Radio Link Control (RLC), Media Access Control (MAC), and higher physical layer (high-PHY) functions. Multiple RUs 121 may communicate with a single DU 122.

The RU 121 serves as the lower physical layer of the air interface between the cellular network User Equipment (UEs) 110. RU 121 handles transmitting and receiving data and/or voice according to a particular wireless communication protocol, such as 3G, 4G LTE, 5G NR, or some future technology, such as 6G or beyond. The RU 121 is connected to one or more antennas 115 that may be located on a tower.

The UEs 110 represent various forms of mobile wireless devices that can communicate using the cellular network. For example, any combination of mobile phones, smartphones, cellular modems, personal computers, wireless sensors, access points (APs), gaming devices, Internet of Things (IoT) devices, and any other 5G-equipped device may function as UEs 121.

FIG. 1 shows certain logical nodes as singular elements, but in many instances each logical node is actually provided for or connected in plural. For example, a number of RUs 121 may be connected to one DU 122, and a number of DUs 122 may be connected to one CU-UP 123. Also, any given RU 121 may be communicating with many UEs 110. Furthermore, a given RIC 130 may be communicating with multiple RANs 125, and a single network core 135 may service multiple RANs 125.

As mentioned, the CU-CP 124 in a RAN 125 connects to the 5G core 135 to provide control plane functionality and access to common data repositories. These may be delivered via a set of interconnected Network Functions (NFs) 160 implemented in the 5G core 135, each with authorization to access each other's services. The connections between the RANs 125 and the 5G core 135 may be through a Next Generation (NG) Application Protocol (NGAP) or other application layer interfaces. Other layers of the communication link between the RANs 125 and core 135 should implement a reliable transport that supports multihoming as more fully described below.

The Network Functions 160 implemented by the 5G core 135 may include at least an Access and Mobility Management Function (AMF) 140, Session Management Function (SMF) 145, and User Plane Function (UPF) 150. Other core Network Functions (NFs) 165 implement network resource management, signaling, packet control, policies, location services, subscriber management, and other functions not shown here. Although not shown in FIG. 1, it should be understood that these other Network Functions 165 may include Unified Data Repository (UDR), Unified Data Management (UDM), Authentication Server Function (AUSF), Network Slice Selection Function (NSSF), Network Exposure Function (NEF), NF Repository Function (NRF), Policy Control function (PCF), Application Function (AF) and Data Network (DN) core services.

Each Network Function 160 may expose its functionality through an Application Programming Interface (API) 180, which may be a Service Based Interface (SBI). In one example, the API 180 may employ a REST interface using HTTP/2 or other protocols such as a Quick UDP Internet Connection (QUIC) protocol. The APIs 180 provides a way for an administrative user 185 to specify services configuration details to a control component 190 (such as a Service Management and Orchestration (SMO) component) 190 that further interfaces to the Network Functions 1160 of the 5G core 135.

Generally, any of the Network Functions 160 can reside as an application running in a virtual machine, that is, they can operate within a virtual machine environment. In turn, the virtual machine can reside in a software container, typically as an orchestrated software container. A software container, by definition, is a package that includes the application program together with all of its dependencies, such as the code, runtime, system libraries, and the like bound together.

Kubernetes is one example of a suitable orchestrated container environment. Kubernetes is an open source, cloud-native container orchestration platform that automates many of the manual processes that would otherwise be involved in deploying and scaling containerized applications. Kubernetes groups the host machines (or "nodes") that execute containerized applications into logical units called "pods". A pod thus consists of one or more containers that are guaranteed to be co-located on the same node. Each pod in Kubernetes is assigned a unique IP address within a cluster of nodes, allowing an application to use communication ports without the risk of conflict.

FIG. 1 thus further shows that in an example embodiment, Network Functions 160 are implemented as one or more pods 170-1, 170-2, . . . , 170-P running in a cloud-native orchestration environment 175 such as Kubernetes. Also in the example embodiment, a given pod 170 is dedicated to implementing only one of the network functions 160. Thus, there is typically at least one pod for each of the network functions 160.

It is also possible that more than one pod 170 is assigned to a given Network Function 160, depending on the processing load placed upon it. In particular, 5G core 135 functions may reside in one or more facilities that serve a metropolitan area, or a geographic region, or even as an entire national technical center. The number of UEs 110 and RANs 125 serviced by such a core 135 may therefore be much larger than if the system 100 only services a single enterprise. Thus the processing demand for a particular Network Function 160 may exceed the demand that can be serviced by a single pod 170. Furthermore, the demand on any given network function 160 may rise or fall over time.

Therefore, it is advantageous for control 190 to determine how many pods 170 should be active for a given Network Function 160 at any given time, handle assignment of those Network Functions 160 to specific pods 170, and configure communication protocol parameters configuration for the pods 170.

Kubernetes itself supports horizontal and vertical autoscaling based on specific metrics such as load. For example, horizontal scaling allows the deployment of more pods when load increases. Vertical scaling updates the resources consumed by a given pod when the load increases.

Thus, it may be possible for the control 190 to be implemented as part of the Kubernetes environment 175. However, performance advantages may be provided by using a separate, dedicated node and/or with a separate, dedicated container orchestrator to implement the control 190.

Regardless of how the control is implemented, the RANs 125 and NFs 160 should communicate with each other using a reliable transport protocol, that is, a protocol which can acknowledge error-free non-duplicated data transfer of data. The reliable protocol may also ensure sequenced delivery of messages within multiple streams, and enable bundling of multiple user messages, and network-level support of multi-homing at either or both ends of a connection.

Multihoming is a method of configuring a host or node with more than one network connection and IP address. Multi-homed communication protocols are normally used to provide fault tolerance, to enhance the reliability of Internet connectivity. However in this instance, as will be explained below, multihoming is also used to enable rapid reconfiguration of the pods 170 that are assigned to implement a given network function 160. With multihoming, pods 170 can be enabled and disabled on demand as the processing load on a Network Function 160 increases or decreases, with minimal need to reconfigure communication interfaces with new addresses. This has the end goal of reducing static power consumption without compromising responsiveness, efficiency or performance.

The RAN 125 may interface to the 5G core 135 executing within the pods 170 in several different ways. The interface should provide transport of messages between the RAN 125 and core 135 endpoints using a protocol that supports multihoming and/or redundancy or geo-redundancy. In one example, this may be through an N2 control plane to the AMF 149 and via an N3 user plane to the UPF 150. The N3 is over a GPRS Tunneling Protocol (GTP) tunnel that uses User Datagram Protocol (UDP) and in N2, Next Generation Application Protocol (NGAP) over Stream Control Transmission Protocol (SCTP). SCTP supports multi-homing but for the User Plane Function (UPF), Session Service and Continuity (SSC) mode 2 and SSC mode 3 can be utilized to help to move an IP anchor point of a UE from one UPF 150 to another UPF 150.

In one embodiment, the multihoming features native to other protocols such as IPV6 may be suitable. An IPV6 implementation may require other support on the host, such as Multipath TCP, Multipath QUIC, etc. or other features specific to IPV6 (e.g. SHIM6).

An endpoint is considered multi-homed if there is more than one transport address that can be used as a destination address to reach that endpoint. Here, multihoming and/or redundancy protocols can be used to implement dynamic configurations of the pods 170 that are assigned to a given 5G core network function 160.

Regardless of type of connection, the approaches described herein generally rely on a network's multihoming, redundancy and/or geo-redundancy model to enable shifting load among the pods 170 that implement Network Functions 160. With such a model, when a primary Network Function 160 goes down, a secondary/redundant Network Function 160 will automatically continue the operation. In a normal redundancy model, the failover from the primary to the secondary, say due to a crash, then happens. However, with the approaches described herein, when the load on a given Network Function 160 is low, the pod 170 hosting one Network Function 160 is forced to go to dormant so that network redundancy model will migrate its load to another pod 170 hosting the redundant Network Function 160 and continue the operation. This saves static energy. If later demand increases and we need to bring the Network Function 160 back online, the load-balancing mechanism can be relied upon to move some of the load the newly activated Network Function 160.

Embodiments described herein thus relate to methods and/or apparatus that implement network functions 160 and thus the pods 170 on hosts that use multihomed endpoints. These endpoints support two or more IP addresses to establish respective associations with another multihomed endpoint such as the CU-UPs 123 within the RANs 125. Endpoints or network entities in certain container-based orchestration systems such as Kubernetes would otherwise natively support only one IP address. However, the provisioning of multihoming now enables efficient implementation of network functions on a variable, dynamic number of pods where this might not otherwise be possible.

Figure 2B:
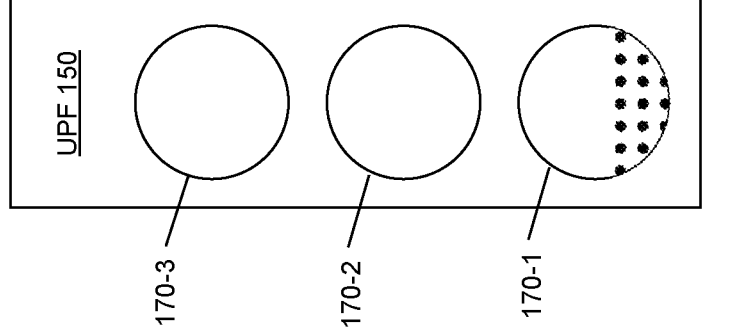
FIGS. 2A and 2B together illustrate the containerized applications instantiated in a cloud-native container orchestration system.
Figure 2A:
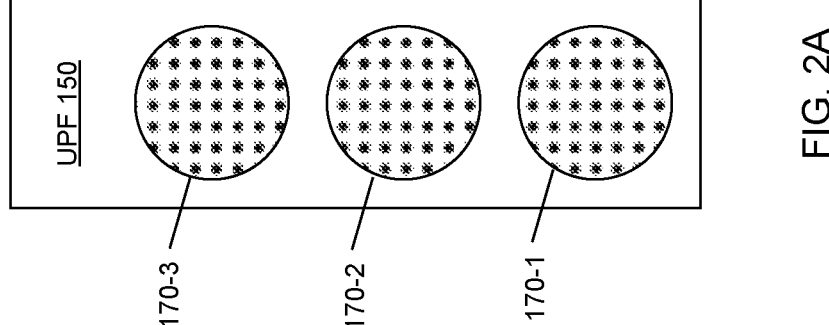

FIGS. 2A and 2B illustrate static and dynamic energy consumption.

Platforms such as pods 170 have two types of energy consumption, namely:
  "dynamic consumption" which depends on the present load, such that energy consumption increases when the load increases, and
  "static consumption", which is the energy consumed at idle state independent of the load.

By scaling down the number of pods 170 and so the number of virtual machines used to implement a Network Function 160 when the load is low, it is possible to enhance static energy efficiency.

For instance, in the state illustrated in FIG. 2A, there are three pods 170-1, 170-2, 170-3 implementing a UPF 150 network function. The shading indicates that the load on each of these pods is relatively high.

When the system state shifts to that shown in FIG. 2B, the demand is now much less, and the required number of pods may horizontally scale from three down to one. Pods 170-2 and 170-3 can be shut down completely such that they do not consume at least dynamic energy.

Both static and dynamic energy consumption will still exist for the single pod 170-1, regardless of the load (even when there is no load) because the single node hosting the single pod 170-1 will still be active.

Figure 3B:
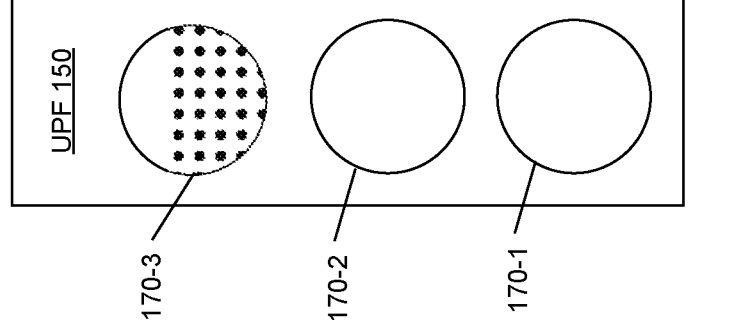
FIGS. 3A and 3B together illustrate how multihoming may be leveraged to reduce static energy consumption.
Figure 3A:
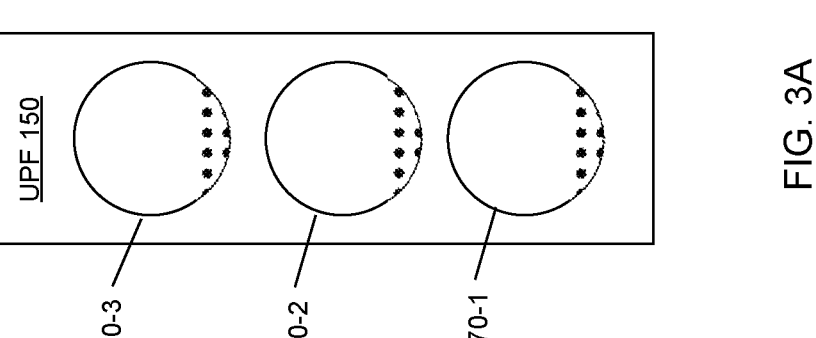

FIGS. 3A and 3B are a similar example of resource sharing but leveraging multihoming to further reduce static energy consumption. Here the three pods 170-1, 170-2, 170-3 share a multihomed address and communicate with the RAN 125 using a multihomed protocol.

In the state shown in FIG. 3B, each of the three pods is active with a relatively low load. Thus the total static energy consumed is 3*E, where E is the static energy consumed by a single pod 170. The dynamic energy consumed is D1+D2+ D3, where D1, D2 and D3 are the dynamic energy consumption for the respective ones of the pods 170-1, 170-2, 170-3.

In the state shown in FIG. 3B, all of the load traffic is migrated to a single pod 170-3 host. The dynamic energy consumption will be the same as in FIG. 3A, but the static energy consumption will now be reduced by shutting down nodes hosting the idle pods 170-1, 170-2 or by at least moving those nodes to deeper sleep-states.

Figure 4B:
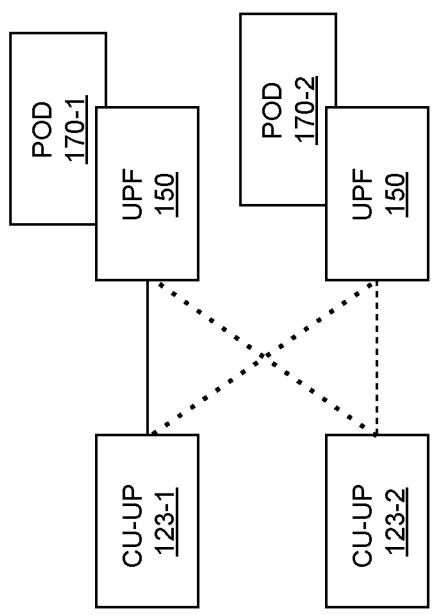
FIGS. 4A and 4B together illustrate how multihoming further enables load shifting among a set of pods that host a given network function.
Figure 4A:
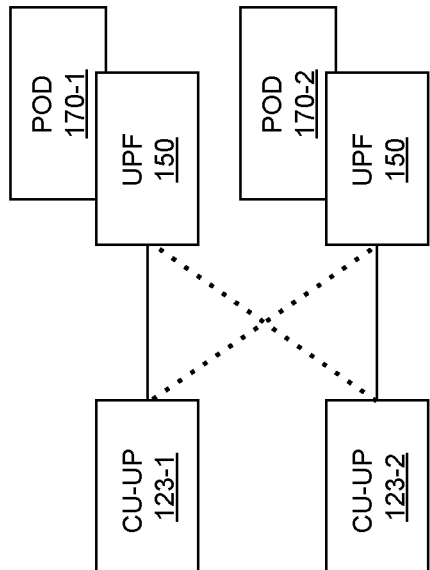

FIGS. 4A and 4B illustrate how multihoming enables reconfiguring the loads of different nodes and thus the pods assigned to host a given Network Function 160.

In this example, a first CU-UP 123-1 in a first RAN 125-1 is connected to a first pod 170-1 to handle packet traffic for the User Plane Function (UPF) 150. Similarly, a second CU-UP 123-2 operating in a second RAN 125-2 is connected to a second pod 170-2 that also implements the UPF 150 to handle packet traffic. Two pods 170-1, 170-2 are needed to adequately service the current traffic load. The dashed line connections indicate that, in the even of a fault requiring failover, pod 170-1 acts as a primary and pod 170-2 as a secondary pod.

However, because the pods 170-1 and 170-2 utilize multihoming, when the traffic load decreases, controller 190 may simply disable pod 170-2, and multihomed traffic will continue to be reliably routed between both CU-UP 123-1 and CU-UP 123-2 and the UPF 150 hosted on pod 170-1 without having to reassign network addresses. Thus, multihoming and/or redundancy and/or geo-redundancy operate such that when a network operator forces one Network Function 160 with low traffic to move to a dormant state, a redundant Network Function picks up the load so that the operation can continue.

Figure 5:
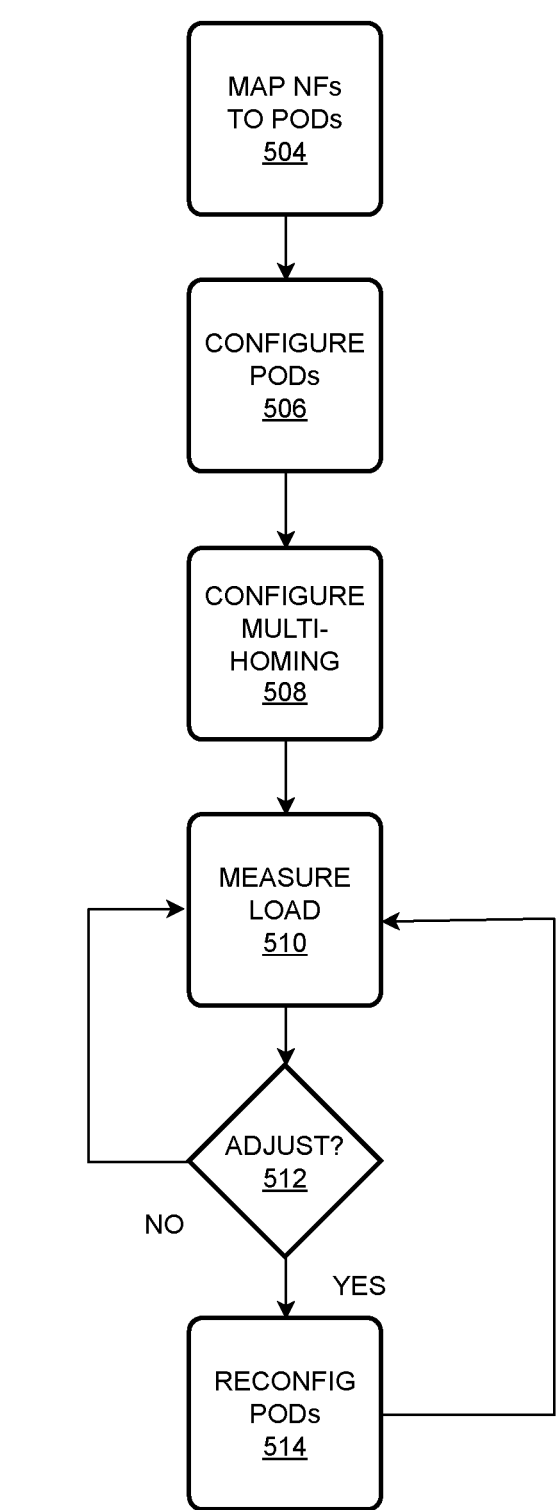
FIG. 5 is an example process flow that may be executed by a control unit that utilizes multihoming for core Network Functions.

FIG. 5 is an example of a process flow 500 that may be executed by the controller 190. The process optimizes energy consumption by leveraging multihome addressing for the containerized nodes that implement the Network Functions 160 of a 5G core 135.

In a first state 504, one or more network functions 160 are mapped to pods 170 within the cloud-native container orchestration environment 175 such as Kubernetes. As explained previously, in preferred embodiment a given pod 170 only hosts a given one of the Network Functions 160. Also, multiple pods 170 may be assigned to host a given Network Function 160, depending on the expected load for that Network Function 160.

In a second state 506, the pods mapped to each Network Function 160 are now configured. That is, the application software that implements the network function and related data structures are containerized and deployed to each pod 170 on a respective host.

In state 508, multihomed addresses are configured for the pods. A given multihome address is assigned to all of the pods 170 that are associated with a given network function 160. This enables the controller 190 to later activate or deactivate the total number of pods associated with that network function 190 depending upon the load without having to reconfigure addressing schemes.

In state 510, the present load is measured. This will be at least a measure of the load on a given network function. However loads across all network functions for which multihoming has been implemented may also be measured.

In state 512, a determination is made as to whether or not the number of pods currently assigned to a given network function 160 matches the current load, or is insufficient to handle the current load on that network function 160, or if the number of pods is excessive.

If the number of pods can adequately handle the current load, then no adjustment is necessary, and processing can return to state 510.

However, if an adjustment to the number of pods 170 (either up or down) is indicated, then pods are reassigned in state 514. Note that in this state no reconfiguration of the multihoming features is necessary, even when the number of pods changes. That is because by associating a multihome address with a given Network Function 160, messages associated with that Network Function 160 will be automatically routed to all of the active pods associated with that multihome address.

Once the pods are reassigned, processing then returns to state 510 where the load is again measured.

Figure 6:
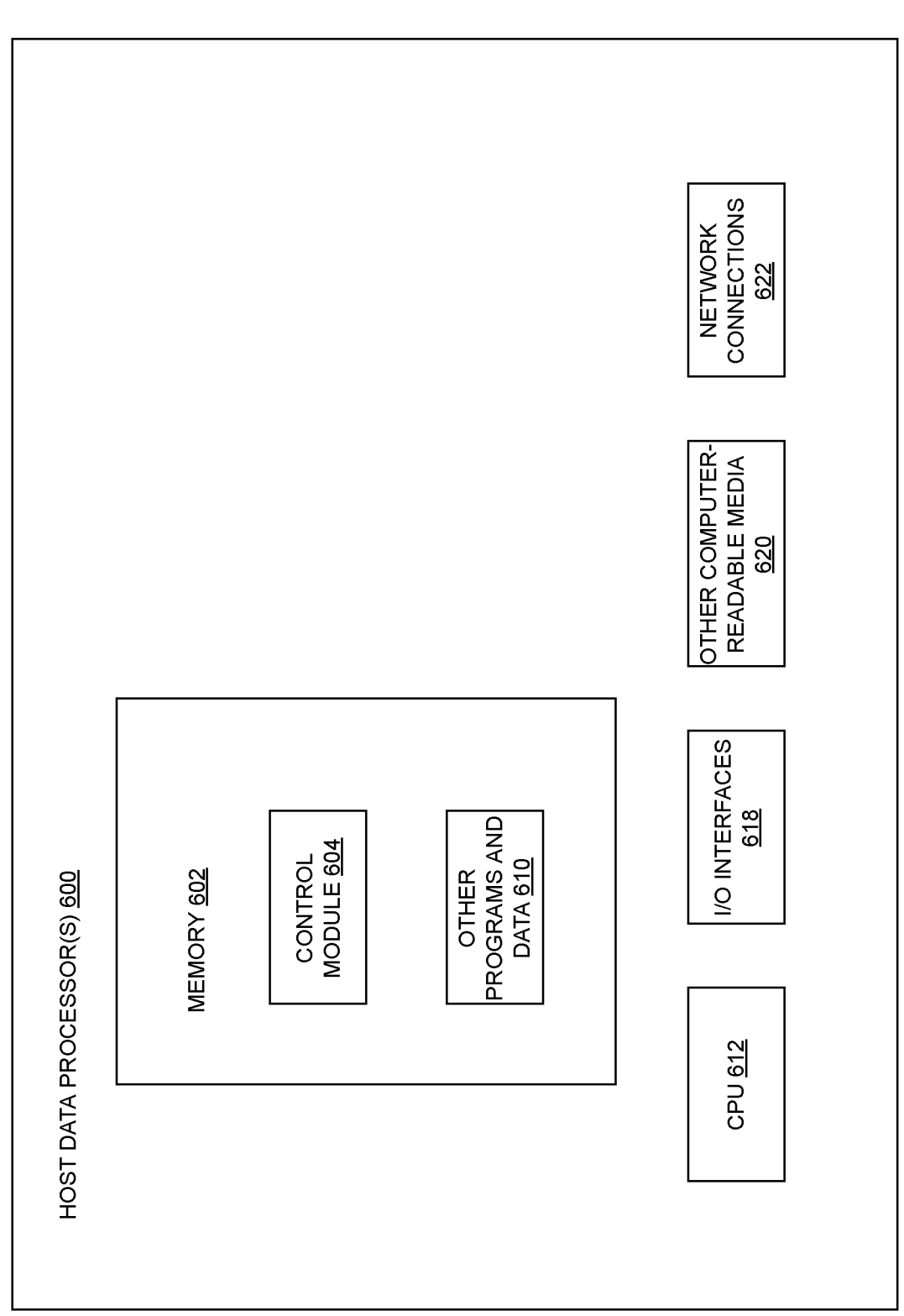
FIG. 6 shows a system diagram that describes an example implementation of underlying data processing system(s) for implementing the embodiments described herein.

FIG. 6 shows a system diagram that describes an example implementation of underlying data processing system(s) 601 for implementing embodiments described herein.

The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 6 illustrates an example of underlying hardware on which such software and functionality may be hosted and/or implemented. Accordingly, various embodiments described herein may be implemented in software, hardware, firmware, or in some combination thereof.

In particular, shown is an example of one of the host computer system(s) 600. Such computer system(s) 600 may represent one or more computers located in various data centers, base stations and cell sites shown and/or described herein that are, or that host or implement the functions of: routers, components, microservices, containers, pods, controllers, nodes, node groups, control planes, clusters, virtual machines, network functions, and other aspects including at least the Radio Access Nodes (RANs) 125 and core Network Functions 160.

Host computer system(s) 600 may each include memory 602, one or more central processing units (CPUs) 614, I/O Interfaces 618, other computer-readable media 620, and network connections 622.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 602 may be utilized to store information, including computer-readable instructions that are utilized by CPU 614 to perform actions, including those of embodiments described herein.

Memory 602 may have stored thereon control module(s) 604. The control module(s) 604 may be configured to implement and/or perform some or all of the functions of the systems, components, software, programs, processes, and modules described herein. Memory 602 may also store other programs and data 610, which may include rules, databases, Application Programming Interfaces (APIs), policy and charging rules and data, OSS data, BSS data, software containers, nodes, pods, clusters, node groups, control planes, software defined data centers (SDDCs), microservices, virtualized environments, software platforms, cloud computing service software, network management software, orchestrator software, one or more network slicing controllers, Network Functions (NF), artificial intelligence (AI) or machine learning (ML) programs or models to perform the functionality described herein, user interfaces, operating systems, other network management functions, other network functions (NFs), etc.

Network connections 622 are configured to communicate with other computing devices to facilitate the functionality described herein. In various embodiments, the network connections 622 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 618 may include user data interfaces, sensor data interfaces, other data input or output interfaces, or the like. Other computer-readable media 620 may include other types of stationary or removable computer-readable media, such as removable flash drives, Solid State Drives (SSDs), external hard drives, or the like.

Further Implementation Options

The disclosure is also not limited by the name of each node described above, and in the case of a logical node or entity performing the above-described function, the configuration of the disclosure may be applied. In addition, the different logical nodes may be physically located in the same or different physical location as other logical nodes, and may be provided with a function by the same physical device (e.g., a processor, a controller, etc.) or by another physical device. As an example, the function of at least one logical node described herein may be provided through virtualization in one physical device.

The methods, systems, and devices discussed above should be considered to be examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional states or steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may then execute the program code to perform the described tasks.

It should be understood that the workflow of the example embodiments described above may be implemented in many different ways. In some instances, the various "data processors" may each be implemented by a physical or virtual or cloud-based general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

Embodiments may also leverage cloud data processing services such as Amazon Web Services, Google Cloud Platform, and similar tools.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

The above description has particularly shown and described example embodiments. However, it will be understood by those skilled in the art that various changes in form and details may be made therein without departing from the legal scope of this patent as encompassed by the appended claims.

The invention claimed is:

1. A method for operating a wireless network, comprising:
operating one or more Radio Access Nodes (RANs), with at least one RAN comprising one or more RAN elements;
operating one or more Network Functions (NFs), each NF instantiated as one or more applications disposed within one or more containers executing on one or more virtualized hosts;
selectively activating or deactivating at least one of the one or more containers based on a demand for utilization of the one or more NFs, wherein at least one of the one or more containers is dedicated to a specific type of NF, and wherein the NFs may be Core Network Functions or Virtual Network Functions;

connecting the one or more RAN elements and one or more NFs via a protocol that supports multihomed addressing according to one or more multihoming parameters, wherein the connecting includes; and selecting the one or more multihoming parameters;

determining a present load on the one or more containers that is dedicated to the specific type of NF:

when the present load is above a predetermined amount, then increasing a number of containers dedicated to the specific type of NF; and when the present load is below some other predetermined amount, then decreasing the number of containers dedicated to the specific type of NE.

2. The method of claim 1 wherein the one or more containers are instantiated in a cloud-native container orchestration system.

3. The method of claim 1 wherein the protocol either a GPRS Tunneling Protocol (GTP) over User Datagram Protocol (UDP) or a Next Generation Application Protocol (NGAP) over Stream Control Transmission Protocol (SCTP).

4. The method of claim 1 wherein the one or more multihoming parameters comprise network addresses corresponding to respective associations between one of the RAN elements and one of one or more NFs.

5. The method of claim 1 wherein the specific type of NF is selected from a group consisting of Access and Mobility Management Function (AMF), Session Management Function (SMF), and User Plane Function 150.

6. The method of claim 5 wherein the type of NF is further selected from a group consisting of Unified Data Repository (UDR), Unified Data Management (UDM), Authentication Server Function (AUSF), Network Slice Selection Function (NSSF), Network Exposure Function (NEF), NF Repository Function (NRF), Policy Control function (PCF), Application Function (AF) and Data Network (DN) core services.

7. The method of claim 1 wherein at least one of the one or more RAN elements comprise one or more of a Centralized Unit-Control Plane (CU-CP), Centralized Unit-User Plane (CU-UP), Distributed Unit (DU), and Radio Unit (RU).

8. The method of claim 1 wherein:

at least one of the one or more RAN elements comprise a Centralized Unit-User Plane (CU-UP);

the one or more NFs include a User Plane Function (UPF);

the UPF is instantiated in a cloud-native container orchestration system; and the protocol is GPRS Tunneling Protocol (GTP) over User Datagram Protocol (UDP).

9. The method of claim 1 wherein the multihomed addressing further implements network redundancy or geo-redundancy.

10. An apparatus for operating a wireless network, the apparatus comprising:

one or more data processors; and one or more computer readable media including instructions that, when executed by the one or more data processors, cause the one or more data processors to perform a process for:

operating one or more Radio Access Nodes (RANs), with at least one RAN comprising one or more RAN elements;

operating one or more Network Functions (NFs), each NF instantiated as one or more applications within one or more containers executing on one or more virtualized hosts;

selectively activating or deactivating at least one of the one or more containers based on a demand for utilization of the one or more NFs, wherein at least one of the one or more containers is dedicated to a specific type of NF, and wherein the NFs may be Core Network Functions or Virtual Network Functions;

connecting the one or more RAN elements and the one or more NFs via a reliable protocol that supports multihomed addressing according to one or more multihoming parameters, wherein the connecting includes selecting the multihoming parameters;

determining a present load on the one or more containers that is dedicated to the specific type of NE:

when the present load is above a predetermined amount, then increasing a number of containers dedicated to the specific type of NF; and when the present load is below some other predetermined amount, then decreasing the number of containers dedicated to the specific type of NF.

11. The apparatus of claim 10 wherein the one or more containers are instantiated in a cloud-native container orchestration system.

12. The apparatus of claim 10 wherein the protocol is either a GPRS Tunneling Protocol (GTP) over User Datagram Protocol (UDP) or a Next Generation Application Protocol (NGAP) over Stream Control Transmission Protocol (SCTP).

13. The apparatus of claim 10 wherein the multihoming parameters comprise network addresses corresponding to respective associations between one of the one or more RAN elements and one of the one or more NFs.

14. The apparatus of claim 10 wherein the specific type of NF is selected from a group consisting of Access and Mobility Management Function (AMF), Session Management Function (SMF), and User Plane Function.

15. The apparatus of claim 14 wherein the specific type of NF is further selected from a group consisting of Unified Data Repository (UDR), Unified Data Management (UDM), Authentication Server Function (AUSF), Network Slice Selection Function (NSSF), Network Exposure Function (NEF), NF Repository Function (NRF), Policy Control function (PCF), Application Function (AF) and Data Network (DN) core services.

16. The apparatus of claim 10 wherein the one or more RAN elements comprise one or more of a Centralized Unit-Control Plane (CU-CP), Centralized Unit-User Plane (CU-UP), Distributed Unit (DU), and Radio Unit (RU).

17. The apparatus of claim 10 wherein:

the one or more RAN elements comprise a Centralized Unit-User Plane (CU-UP);

the one or more NFs include a User Plane Function (UPF);

the UPF is instantiated one or more containers are instantiated in a cloud-native container orchestration system; and the protocol is GPRS Tunneling Protocol (GTP) over User Datagram Protocol (UDP).

18. The apparatus of claim 10 wherein the multihomed addressing further implements network redundancy or geo-redundancy.

* * * * *